United States Patent Office 3,649,635
Patented Mar. 14, 1972

3,649,635
SPIROPYRANOPYRIDINES
Maximilian von Strandtmann, Rockaway, Marvin P. Cohen, New Milford, and John Shavel, Jr., Mendham, N.J., assignors to Warner-Lambert Company, Morris Plains, N.J.
No Drawing. Filed Oct. 24, 1969, Ser. No. 869,335
Int. Cl. C07d 35/10
U.S. Cl. 260—287 R
1 Claim

ABSTRACT OF THE DISCLOSURE

The present invention is concerned with spiropyranopyridines of Formula I:

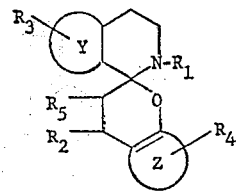

wherein Y and Z are aromatic or heteroaromatic nuclei, $R_1$, $R_2$, $R_3$, $R_4$ and $R_5$ are hydrogen or various substituents such as alkyl, aryl, alkoxy, halogen, etc.

---

The compounds of this invention are useful as antiarrhythmic agents.

The present invention relates to spiropyranopyridines having the following structural formula:

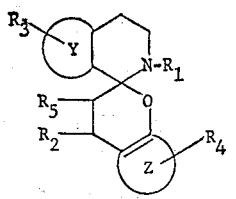

(I)

wherein Y and Z are aromatic or heteroaromatic nuclei; $R_1$, $R_2$ and $R_5$ are hydrogen, lower alkyl, aryl, acyl or aralkyl, $R_3$ and $R_4$ are hydrogen, lower alkoxy, lower alkyl, aryl, aralkyl, amino, hydroxy, acetyl, nitro, or halogen.

As used in this disclosure, the term "halogen" comprehends all four halogens, i.e., chlorine, bromine, iodine, and fluorine. The term "lower alkyl" as used herein includes lower aliphatic hydrocarbons having 1 to 7 carbon atoms in the carbon chain. It includes straight chain as well as branched chain radicals. This term includes, for example, methyl, ethyl, propyl, isopropyl and the like. The term "aryl" as used in this disclosure denotes a monocyclic hydrocarbon radical, preferably of 6 to 10 carbon atoms, such as phenyl, tolyl, and the like. The term "aryl" also includes aromatic or heteroaromatic hydrocarbons as defined above in which one or more hydrogen atoms of the phenyl portion have been substituted by a functional group such as halogen, hydroxyl, lower alkyl, trifluoromethyl, amino, substituted amino, or lower alkoxy and the like. The term "aralkyl" encompasses lower alkyl groups in which an aryl group as defined above is substituted for a hydrogen atom, such as for example, benzyl, phenethyl or the like and also includes such groups wherein one or more of the hydrogen atoms of the phenyl portion have been substituted by a functional group as indicated above. The term "aromatic"

or "heteroaromatic" includes a group such as benzene, naphthalene, phenanthrene, pyridine, quinoline, isoquinoline, pyrrole, indole, carbazole and the like. The term "acyl" are those hydrocarbon carboxylic acids as exemplified by the lower alkanoic acids and the monocyclic aryl carboxylic acids, for example, benzoic and toluic, and the monocyclic aryl lower alkanoic acids, for example, phenacetic and the like.

The compounds of this invention exhibit antiarrhythmic properties in several mammalian species, for example, beagle dogs, cats, and the like, for example, at a dose of about 3 to 5 mg./kg. intravenously. They are effective in oubain induced arrhythmia in beagle dogs. They are useful in the treatment of cardiac arrhythmia. Generally speaking, a dosage level of 3 to 5 mg./kg. orally, or by injection, two or three times a day is prescribed to treat cardiac arrhythmias. This dose level can be varied according to the species of mammal being treated and also the age, weight, sex, and the severity of the condition of the mammal.

In order to use these compounds, they are combined with pharmaceutically acceptable excipients, for example, lactose, decalcium phosphate, and granulated with suitable granulating agents, such as water, alcoholic gelatin solution and the resulting granules are compressed into tablets. Other known pharmaceutical dosage forms, such as pills, capsules, elixirs can also be compounded according to methods well known to the pharmacist's art. For parenteral use, the compounds of this invention are suspended or dissolved in a parenterally acceptable vehicle, such as saline, water for injection, sesame oil and the like.

According to the present invention, the spiropyranopyridines are prepared from phenolic Mannich bases of the Formula III:

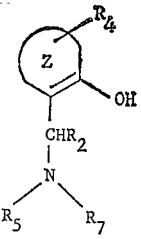

(III)

and partially reduced heteroaromatic compounds of the Formula II:

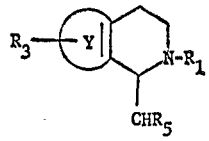

(II)

wherein $R_6$ and $R_7$ are lower alkyl, aryl, aralkyl, or taken together with the nitrogen atom to which they are attached from a pyrrole, morpholine, piperidine or piperazine ring.

Compounds of Type II are prepared by standard methods such as described by F. Bohlmann in Chemische Berichte, 100, 2742 (1967). Compounds of Type III are available from commercial sources and can be prepared by standard procedures, described in "α-Aminoalkylierung" by Hellmann and Opitz, Verlag Chemie GmbH, Weinheim, Germany (1960).

The following examples are included in order further to illustrate the invention.

EXAMPLE 1

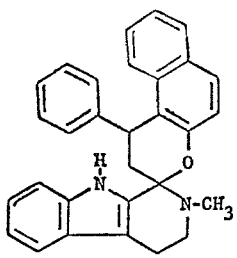

1,2,3,4-tetrahydro-2-methyl-1-phenylspiro[3H-naphtho-[2,1-b]pyran-3,1(2H)pyrido[3,4-b]indole]

A solution of 10 g. of 1-methyl-3,4-dihydro-β-carboline methiodide in 600 ml. of boiling H₂O is made strongly basic with 40% NaOH. The mixture is chilled, and extracted with three 150 ml. portions of ether. Combined ether and extracts are dried over Na₂SO₄, and taken down to a gum under reduced pressure. The gum is dissolved in 30 ml. of dioxane, 8.31 g. of 1-(2-dimethylaminobenzyl)-2-naphthol is added, and the solution is refluxed under a stream of nitrogen for 3 hours. A heavy crystalline precipitate forms. The reaction mixture is chilled, and the crystals are filtered off, and recrystallized from CH₃CN; M.P. 197–200° C.; yield 8 g. (62%).

Analysis.—Calcd. for $C_{30}H_{26}N_2O$ (percent): C, 83.69; H, 6.09; N, 6.51. Found (percent): C, 83.65; H, 6.06; N, 6.41.

EXAMPLE 2

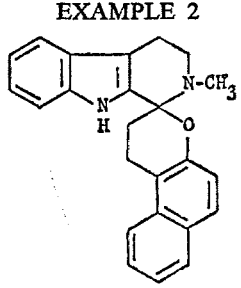

1,2,3,4-tetrahydro-2-methylspiro[3H-naphtho-[2,1-b]pyran-3,1(2H)-pyrido[3,4-b]indole]

A solution of 10 g. of 1-methyl-3,4-dihydro-β-carboline ·CH₃I in 600 ml. of boiling H₂O is made strongly basic with 40% NaOH. The chilled mixture is then extracted with three 150 ml. portions of ether. The combined ether extracts are dried over Na₂SO₄ and taken down to a gum under reduced pressure. The gum is dissolved in 30 ml. of dioxane, 6 g. of 1-dimethylaminomethyl-2-naphthol is added, and the solution is refluxed under a stream of nitrogen for 3 hours. The solution is cooled, and the crystalline precipitate that forms is filtered off, washed with dioxane, and recrystallized from ethyl acetate with the aid of charcoal, M.P. 178–181° C.; yield 4 g. (38%).

Analysis.—Calcd. for $C_{24}H_{22}N_2O$ (percent): C, 81.32; H, 6.26; N, 7.90. Found (percent): C, 81.26; H, 6.40; N, 7.85.

EXAMPLE 3

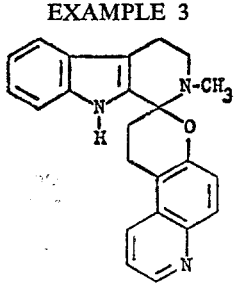

·2Cl·½C₂H₅OH 1,2,3,4-tetrahydro - 2 - methylspiro[3H-pyrano[3,2-f]quinoline - 3,1(2H)pyrido[3,4-b]indole]dihydrochloride hemiethanolate A solution of 10 g. of 1-methyl-3,4-dihydro-β-carboline methiodide in 600 ml. of boiling H₂O is made strongly basic with 40% NaOH. The mixture is chilled and extracted with three 150 ml. portions of ether. Combined ether extracts are dried over Na₂SO₄, and taken down to a gum under reduced pressure. The gum is dissolved in 30 ml. of dioxane, 6 g. of 5-[(dimethylamino)methyl]-6-quinolinol is added, and the solution is refluxed under a stream of nitrogen for 2 hours. A heavy precipitate forms in the reaction mixture. The mixture is cooled, the crystals are filtered off, washed with cold dioxane, and dissolved in 100 ml. of hot 1 N HCl. On cooling, crystals deposit. These are filtered and recrystallized from 50% aqueous ethanol, M.P. 271–277° C.; yield 9 g. (65%).

Analysis.—Calcd. for $C_{23}H_{21}N_3O \cdot 2HCl \cdot \frac{1}{2}C_2H_5OH$ (percent): C, 63.86; H, 5.80; N, 9.31; Cl, 15.71. Found (percent): C, 63.77; H, 5.67; N, 9.39; Cl, 15.81.

EXAMPLE 4

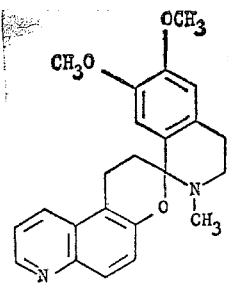

1,2,3,4-tetrahydro-6,7-dimethoxy-2-methylspiro[isoquioline-1(2H),3(3H)pyrano[3,2-f]quinoline]

A solution of 2.19 g. of 1,2,3,4-tetrahydro-6,7-dimethoxy-2-methyl-1-methylene isoquinoline and 2 g. of 5-(dimethylaminomethyl)-6-quinolinol in 10 ml. of dioxane is refluxed under a stream of nitrogen for 45 minutes. The solution is chilled, and the crystalline precipitate that forms is filtered off, washed with cold dioxane, and recrystallized from CH₃CN, M.P. 178–179° C.; yield 1 g. (26%).

Analysis.—Calcd. for $C_{23}H_{24}N_2O_3$ (percent): C, 73.38; H, 6.43; N, 7.44. Found (percent): C, 73.59; H, 6.63; N, 7.47.

EXAMPLE 5

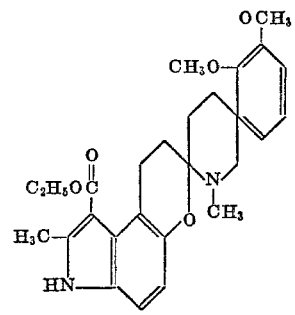

Ethyl 3,4,8′,9′-tetrahydro - 6,7 - dimethoxy-2,2′-dimethylspiro[isoquinoline - 1(2H),7′(7′H),-[3H]pyrano[3,2-e]indole]-1′-carboxylate A solution of 8.8 g. of 1,2,3,4-tetrahydro-6,7-dimethoxy-2-methyl-1-methyleneisoquinoline and 11 g. of ethyl 6-hydroxy - 5 - (dimethylaminomethyl) - 2 - methylindole-3-carboxylate in 40 ml. of dioxane is refluxed for 1.5 hr. under a stream of nitrogen. The dioxane is removed under reduced pressure and the residue is recrystallized from absolute ethanol, M.P. 176–177.5° C.; yield 5 g. (28%).

Analysis.—Calcd. for $C_{26}H_{30}N_2O_5$ (percent): C, 69.31; H, 6.71; N, 6.22. Found (percent): C, 69.24; H, 6.94; N, 6.16.

EXAMPLE 6

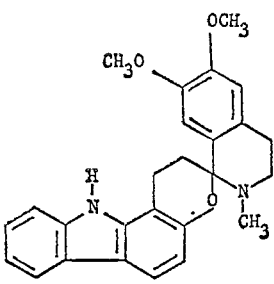

1,2,3',4' - tetrahydro-6',7'-dimethoxy-2'-methylspiro[11H-1-benzopyrano[5,6-b]indole-3(3H)-1'(2'H)-isoquinoline]

This is prepared from 9.6 g. of 1-(dimethylamino-2-hydroxymethyl)carboxazol, and 8.8 g. of 1,2,3,4-tetrahydro-6,7-dimethoxy - 2 - methyl-1-methyleneisoquinoline in analogous fashion to 1',2',3,4-tetrahydro-2-methylspiro[isoquinoline-1(2H),3'(3'H)-naphtho[2,1-b]pyran]. The material is recrystallized from ethyl acetate, M.P. 134–139° C.; yield 2 g. (12%).

Analysis.—Calcd. for $C_{26}H_{26}N_2O_3$ (percent): C, 75.34; H, 6.32; N, 6.76. Found (percent): C, 75.14; H, 6.34; N, 6.92.

EXAMPLE 7

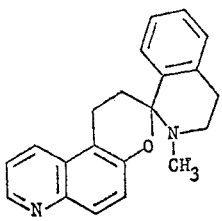

1',2',3,4-tetrahydro-2-methylspiro[isoquinoline-1(2H),3'(3'H)pyrano[3,2-f]quinoline]

A solution of 6.4 g. of 1,2,3,4-tetrahydro-2-methyl-1-methyleneisoquinoline and 8 g. of 5-(dimethylaminomethyl)-6-quinolinol in 40 ml. of dioxane is refluxed under a stream of nitrogen for 1.5 hr. The mixture is chilled and the heavy crystalline precipitate is filtered off and recrystallized from ethanol, M.P. 164–167° C.; yield 8 g. (63%).

Analysis.—Calcd. for $C_{21}H_{20}N_2O$ (percent): C, 79.71; H, 6.37; N, 8.85. Found (percent): C, 79.93; H, 6.39; N, 8.63.

EXAMPLE 8

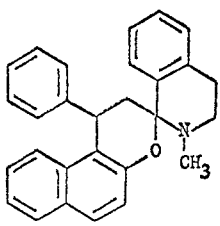

1',2',3,4-tetrahydro-2-methyl-1'-phenylspiro[isoquinoline-1(2H),3'(3'H)-naphtho[2,1-b]pyran]

This is prepared from 13.7 g. of 1-(α-dimethylaminobenzyl)-2-naphthol and 8 g. of 1,2,3,4-tetrahydro-2-methyl-1-methyleneisoquinoline in analogous fashion to 1',2',3,4 - tetrahydro - 2 - methylspiro[isoquinoline - 1(2H),3'(3'H)-naphtho[2,1-b]pyran]. The material is recrystallized from ethyl acetate, M.P. 172–173° C.; yield 8 g. (43%).

Analysis.—Calcd. for $C_{28}H_{25}NO$ (percent): C, 85.90; H, 6.44; N, 3.58. Found (percent): C, 85.73; H, 6.39; N, 3.40.

EXAMPLE 9

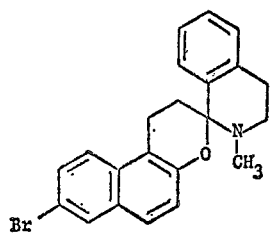

8'-bromo-1',2',3,4-tetrahydro-2-methylspiro[isoquinoline-1(2H),3'(3'H)-naphtho[2,1-b]pyran]

This is prepared from 2 g. of 6-bromo-1-(dimethylaminomethyl) - 2 - naphthol, and 1.14 g. of 1,2,3,4-tetrahydro - 2 - methyl - 1 - methyleneisoquinoline in analogous fashion to 1',2',3,4 - tetrahydro - 2 - methylspiro[isoquinoline - 1(2H),3'(3'H) - naphtho[2,1 - b]pyran]. The material is recrystallized from $CH_3CN$, M.P. 171–173.5° C.; yield 2 g. (71.5%).

Analysis.—Calcd. for $C_{22}H_{20}BrNO$ (percent): C, 67.01; H, 5.11; N, 3.55. Found (percent): C, 67.18; H, 5.07; N, 3.73.

EXAMPLE 10

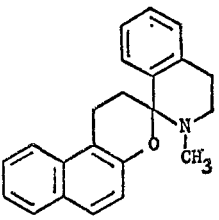

1',2',3,4-tetrahydro-2-methylspiro[isoquinoline-1(2H),3'(3'H)-naphtho[2,1-b]pyran]

A solution of 15 g. of 2 - methyl - 1 - methylene-1,2,3,4 - tetrahydroisoquinoline, 19 g. of 1 - dimethylaminomethyl - 2 - naphthol in 100 ml. of dioxane is refluxed under a stream of nitrogen for 4 hours. The dioxane is removed under reduced pressure and the residue is recrystallized from abs. ethanol, M.P. 138–141° C.; yield 15 g. (50%).

Analysis.—Calcd. for $C_{22}H_{21}NO$ (percent): C, 83.77; H, 6.71; N, 4.44. Found (percent): C, 83.53; H, 6.67; N, 4.39.

What is claimed is:
1. Ethyl 3,4,8',9' - tetrahydro - 6,7 - dimethoxy-2,2'-dimethylspiro[isoquinoline - 1(2H),7(7'H),-[3H]pyrano-[3,2-e]indole]-1'-carboxylate.

References Cited

UNITED STATES PATENTS 3,549,641  12/1970  Von Strandtmann ____ 260—287
3,565,903  5/1971   Von Strandtmann ____ 260—288

OTHER REFERENCES

Bobranski et al., abstracted in Chem. Abstr. vol. 61, col. 4310b (1964).

DONALD G. DAUS, Primary Examiner

U.S. Cl. X.R.

260—283 R, 286 R, 288 R, 289 R, 296 PYC 326.14; 424—258, 263, 274